United States Patent [19]

Williams

[11] 4,245,570
[45] Jan. 20, 1981

[54] SEWAGE SLUDGE DISPOSAL APPARATUS AND METHOD OF DISPOSAL

[76] Inventor: Robert M. Williams, 16 La Hacienda, Ladue, Mo. 63124

[21] Appl. No.: 33,434

[22] Filed: Apr. 26, 1979

Related U.S. Application Data

[63] Continuation-in-part of Ser. No. 921,739, Jul. 3, 1978, abandoned.

[51] Int. Cl.³ .............................................. F23G 7/04
[52] U.S. Cl. .................................. 110/238; 110/204; 110/222; 110/224; 110/244; 110/346; 241/24; 241/48; 241/52; 241/68
[58] Field of Search ............... 110/204, 218, 219, 220, 110/221, 222, 224, 235, 238, 243, 244, 346; 241/24, 34–36, 38, 47, 48, 52, 68

[56] References Cited

U.S. PATENT DOCUMENTS

| | | | |
|---|---|---|---|
| 2,029,725 | 2/1936 | Kuhner | 110/222 |
| 2,032,402 | 3/1936 | Colby et al. | 110/220 |
| 2,066,418 | 1/1937 | O'Mara | 110/220 |
| 2,148,447 | 2/1939 | Dundas et al. | 110/222 X |
| 2,148,981 | 2/1939 | Dundas et al. | 110/222 |
| 2,213,668 | 9/1940 | Dundas et al. | 110/220 |
| 3,109,392 | 11/1963 | Riepl et al. | 110/222 |
| 3,794,251 | 2/1974 | Williams | 241/65 |
| 4,061,274 | 12/1977 | Williams | 241/24 |

*Primary Examiner*—Edward G. Favors
*Attorney, Agent, or Firm*—Gravely, Lieder & Woodruff

[57] ABSTRACT

A system for disposing of sewage sludge by treating the sludge in apparatus which processes the sludge through relatively inert gas drying and grinding stages and utilized as much of the dried and ground sludge as is needed to produce heat for maintaining the drying process in the system once the system has become substantially self sufficient on use of the sludge as the drying heat source. The remaining excess sludge is then in a form either granular or fine suitable for direct sale.

26 Claims, 4 Drawing Figures

SEWAGE SLUDGE DISPOSAL APPARATUS AND METHOD OF DISPOSAL

BACKGROUND OF THE INVENTION

This application is a continuation-in-part of my earlier filed application for patent bearing Ser. No. 921,739 filed July 3, 1978 now abandoned.

The production of sewage is, as every one recognizes, something that takes place almost without let up. Communities, large or small in the past have usually depended on the disposal of sewage sludge by burying it in landfills or dumping the sludge at sea which has been a favorite method for coastal and near-coastal communities, or in some instances by burning the sludge in furnaces fired by an outside fuel supplied for that purpose. Ecological restrictions are now cutting off landfill and sea burial disposal, and the rising cost of outside fuels makes the burning of sludge doubtful economically.

There appears to be very little effort directed toward finding an ecologically sound and economical feasible method for disposing of sewage sludge, except in the production of a fertilizer material which is quite expensive.

What has been developed on the subject of sewage disposal may be represented by the disclosure in Colby et al U.S. Pat. No. 2,032,402 issued Mar. 13, 1936 which deals with a system for sludge disposal by burning with the aid of outside fuel such as coal, or by the disclosure in O'Mara U.S. Pat. No. 2,066,418 issued Jan. 5, 1937 for a sludge disposal plant in which sludge is burned in a furnace after being processed in a pulverizing mill and the mill output divided between recycling to the mill and delivery to the furnace. A more elaborate system for disposing of sewage waste has been disclosed in Dundas et al U.S. Pat. No. 2,213,668 issued Sept. 3, 1940 wherein a two-stage grinding system includes the addition of an outside fuel, such as coal, to the waste which has been processed in the first stage grinder.

The general concept of using the ground waste material as a fuel to produce heat for drying incoming wet waste, and to reduce the use of an outside fuel is disclosed in Williams U.S. Pat. No. 3,794,251 issued Feb. 26, 1974, or in Williams U.S. Pat. No. 4,061,274 issued Dec. 6, 1977. On the other hand, the direct burning of sewage sludge has been disclosed in Kuhner U.S. Pat. No. 2,029,725 issued Feb. 4, 1936 where the high moisture content of the sludge requires use of an outside fuel to maintain combustion and the heat produced is used to generate steam for electric generation purposes.

BRIEF DESCRIPTION OF THE INVENTION

This invention is directed to the disposal of sewage sludge by equipment having the capability of burning it in a system that uses the heat value in the sludge to produce needed drying heat.

The important objects of the invention are to provide a system of equipment which utilizes the sewage sludge itself as a fuel to do the necessary drying of the raw sewage sludge, to provide a unique system of equipment which processes and substantially dries sewage sludge in a substantially continuously operating manner, to recover the BTU heat value in sewage sludge through equipment that uses no outside fuel, to provide sewage sludge disposal equipment capable of producing a supply of sludge derived product useful as a fuel or as a fertilizer, and to provide a system of apparatus that offers an efficient way to dispose of sewage sludge.

A preferred embodiment of the present invention comprises equipment for the preconditioning of sewage sludge to reduce its water content, feeding the thus preconditioned sludge into a grinder where it is ground to a predetermined state of fineness, recovered after the grinding and consumed in a furnace where the BTU heat value is imparted to hot gas used to reduce moisture in the sludge, and exhausting to atmosphere a portion of the hot gases which carry off moisture extracted during the process of drying the sewage sludge to render it capable of being ground.

The preferred embodiment also possesses the unique feature of bleeding off from the grinding mill a portion of the sludge which contains the hard to grind components, and either recirculates the latter components or collects some of the latter components as a product that can be sold commercially. This unique feature leads to the output from the mill being refined to the extent that it is substantially free of the hard-to-grind components and has a very low fuel ash content. The successful processing and preparation of sewage sludge for burning, as well as for production of a commercially viable by-product, is achieved through a roller mill having a grinding chamber with a bottom outlet and a bustle surrounding the grinding chamber for the admission of hot gases which promote the drying of the sewage sludge within the mill.

A modified embodiment of the foregoing is directed to apparatus arranged to rid the system of poluting the ambient area of strong odors usually associated with the treatment of sewage sludge and waste materials. This modification may be put into practice by directing the odor carrying gases through a heat energy recovery heat exchanger to a burner where combustion heat is applied to destroy odor in a primary stage heat exchanger, and returning the gases to the energy recovery heat exchanger where it yields a substantial amount of heat to the odor carrying gases.

A variation of the foregoing modified embodiment is directed to the direct exposure of the gases to combustion flames where the odor is removed by burning and the heat of a portion of the non-odor stack gases is applied in the energy recovery heat exchanger for recovery of the system energy.

BRIEF DESCRIPTION OF THE DRAWINGS

The presently preferred embodiments of the invention are disclosed in and by the accompanying drawings, wherein.

DETAILED DESCRIPTION OF THE INVENTION

The apparatus to be described is made up of known components which heretofore have well understood principles of operation. However, when the apparatus is assembled in the manner set forth herein its end purpose is wholly new, and a new result of unexpected and certainly new and useful nature is achieved.

Figure 1:
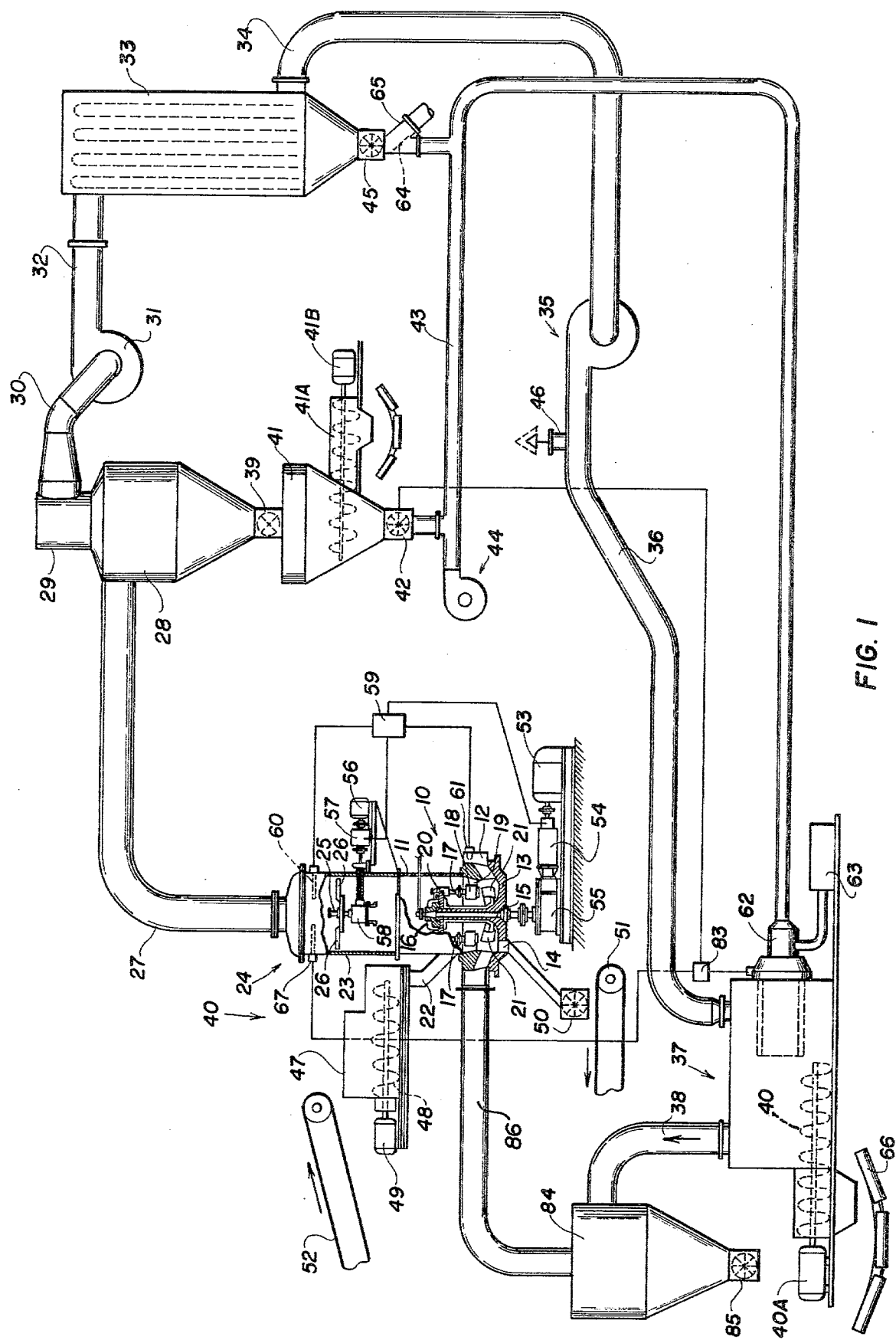
FIG. 1 is a schematic arrangement of the essential components which make up the sewage sludge disposal system.

The schematic view of FIG. 1 is seen to include a roller grinder mill 10 having a casing 11 which is formed with an air or hot gas receiving bustle 12. The casing has a bottom closure wall 13 formed with an outlet 14. A drive shaft 15 extends upwardly through a suitable column which extends upwardly in the casing to a top bearing where the shaft 15 connects with a drive head 16. The head 16 supports arms 17 which carry the grinding rolls 18 in position to grind material against the bull ring 19. The head 16 drives a tubular counter shaft 20 which surrounds the column and extends toward the casing bottom wall where suitable plow blades 21 are connected to stir, agitate and lift material upwardly into the grinding zone of the bull ring 19. The material to be ground is conducted by chute 22 into the casing above the grinding rolls 18 so the material can fall into the orbit of the rollers.

The ground material is caused to move upwardly through casing 11 and into a casing 23 of a spinner separator 24. The casing supports a spinner head 25 having blades 26 which function to separate out larger particles and return them to the mill 10. The finer ground material can pass through the spinner into the exit conduit 27 and flow into a cyclone separator 28. The cyclone separator 28 has an air or gas outlet 29 connected by conduit 30 to the primary circulating fan 31. The fan outlet conduit 32 is connected into a bag house 33 where the gases are cleaned of dust and fines and pass out at conduit 34 to flow into the inlet for the secondary fan 35. The gases are conveyed by conduit 36 into the heat producing furnace 37. It can now be seen that the hot gases exhausted at the furnace stack 38 are directed into the mill 10 at the bustle 12. The furnace is provided in the bottom of the combustion chamber with a screw type ash removal conveyor 40 driven by motor 40A. The ash expelled from the furnace 37 is collected in a suitable receiver (not shown).

In the foregoing system, the cyclone separator 28 is provided with a rotary exhaust valve 39 which is connected into a ground material receiving bin 41. The bin 41, in turn, has a rotary exhaust valve 42 which operates to release the grindings into a feed conduit 43 which is pressurized for moving the grindings by a fan 44. The conduit 43 extends to the furnace 37 to deliver the grindings for consumption as a fuel for the furnace. A portion of the grindings may consist of the dust forming fines released at the bag house rotary exhaust valve 45 into conduit 43. It can be seen that the gases moved by the secondary fan 35 have a portion thereof released to ambient atmosphere at the exhaust stack 46.

In the system of this apparatus, the incoming raw sewage sludge is delivered to a hopper 47 which is provided with an agitating and mixing type screw conveyor means 48 driven through means 49. The screw conveyor means 48 may be side-by-side counter rotating screws or augers. The raw sewage sludge is mixed with partially dried grindings collected from the bottom outlet 14 of the mill 10 and released through the rotary exhaust valve 50 onto a suitable conveyor 51. The conveyor 51 is connected in a suitable manner (not shown) to a second conveyor 52 which delivers the material to the hopper 47. In this way, partly ground or reduced material tapped out of the bottom outlet 14 of the mill 10 is recycled to be mixed with fresh incoming sludge in the hopper 47. The recycled and partly ground material has been subjected to drying heat so it has reduced moisture content and can thus reduce the moisture content of the material in the hopper 47.

The mill 10 is operated by a motor 53 which drives a speed regulatable transmission 54 connected to a gear transmission unit 55 operating the shaft 20 for the grinding rollers 18. Motor 56 drives a speed regulatable transmission 57 connected to a gear transmission unit 58 operating the spinner head 25 carrying blades 26. The regulation of the speed of transmissions 54 and 57 is governed through control means 59 which may be responsive to a sensor 60 in the head of the spinner separator 23 and a sensor 61 in the bustle 12 at the mill 10. The sensors measure the static pressure at the top or head of the spinner separator and in the bustle or windbox 12 at the mill. The difference in the pressure at these zones is desirably kept at a substantially constant level of about 8 to 10 inches of water by control means 59 which translates the respective pressures at means 60 and 61 into signals that control the speeds of the mill rolls and the separator blades. The effect of this control is to operate the mill at speeds which are inversely related to the speeds of the spinner separator. Thus, if the mill runs faster its product will be ground finer so the spinner blades 26 do not need to spin as fast because less material will be of the larger returnable sizes.

The apparatus shown in FIG. 1 would operate as follows where the feed of sewage sludge is calculated at about the most severe level of about 400 pounds of sludge and 1600 pounds of water for a total feed of 2000 pounds per hour. That means that the raw sludge is about 80% water. After start-up and when the system is operating as intended, the heat from the furnace, initially using an outside fuel supplied to the burner 62 from a suitable source 63, will be derived solely from the dried sludge and will exert a drying effort in the mill chamber. The mill chamber will allow a certain percentage of the partially ground material to drop into the bottom outlet 14 where it will be delivered to the feed hopper 47 and be mixed by the screw means 48 and recycled with fresh sewage sludge. The system can be operated with up to 60% of the input to the mill 10 through chute 22 being recycled by conveyor means 51 and 52 to the hopper 47. The recycled material would be dried to a large extent and would be granular since the ground fines have been air separated and removed.

One example of operation is to supply the mill 10 with two tons per hour of material which would be composed of one ton of raw sewage sludge at whatever state of wetness, and one ton of recycled granular material derived through the bottom outlet 14 of the mill 10. The mill would then deliver one ton of fine ground material to the separator 24, and that would pass on to the cyclone separator 28 and be exhausted through rotary valve 39 to the bin 41. The size range of the grind can vary from 50% minus 100 mesh to 70% minus 200 mesh as needed by the burner 62. From the bin 41 blower 44 would transport the fine ground material through conduit 43 into the burner 62 at the furnace 37. Along the way the fines extracted from the gases in the cyclone 28 at the bag house 33 could be added to the fines and also move to the furnace 37, or by the setting of the valve 64 the fines could be diverted into conduit 65 and collected for landfill disposal. The burning of the fines from bin 41 would generate hot gases at the stack 38 for use as the drying medium in the mill 10. The ash or residue of combustion in furnace 37 would be extracted by the screw 40 operated by motor 40A. However, ash carried into stack 38 can be separated out by the cyclone 84 and added to the ash extracted by the screw 40. The ash free hot gas from cyclone 84 is led by conduit 86 into the bustle 12 of mill 10. In the example noted, the ash produced in the burning step might be as much as about one percent. The ash discharged by the furnace screw 40 and the cyclone 84 through valve 85 is carried away by conveyor 66. A desired operating condition is to maintain the temperature in the spinner separator at about 250° F. for its drying effect. To do this, a temperature sensor 67 is connected to a control center 83 at the burner 62 and the center 83 is connected to rotary valve 42 to adjust the fuel feed from valve 42 at a rate which will generate heat of the order of 250° F. at that zone.

The cyclone separator 28 extracts most of the fine ground material and discharges it through rotary valve 39 into bin 41. The grindings collect rapidly so the bin 41 is provided with a screw conveyor 41A located at a level above its outlet valve 42 so that there will be an adequate supply of ground material for the burner 62. As the fine ground material collects in the bin and reaches the position of the screw conveyor, the constantly running screw conveyor 41A driven by motor 41B in known manner will skim off or extract the excess which can be collected and sold.

Figure 2:
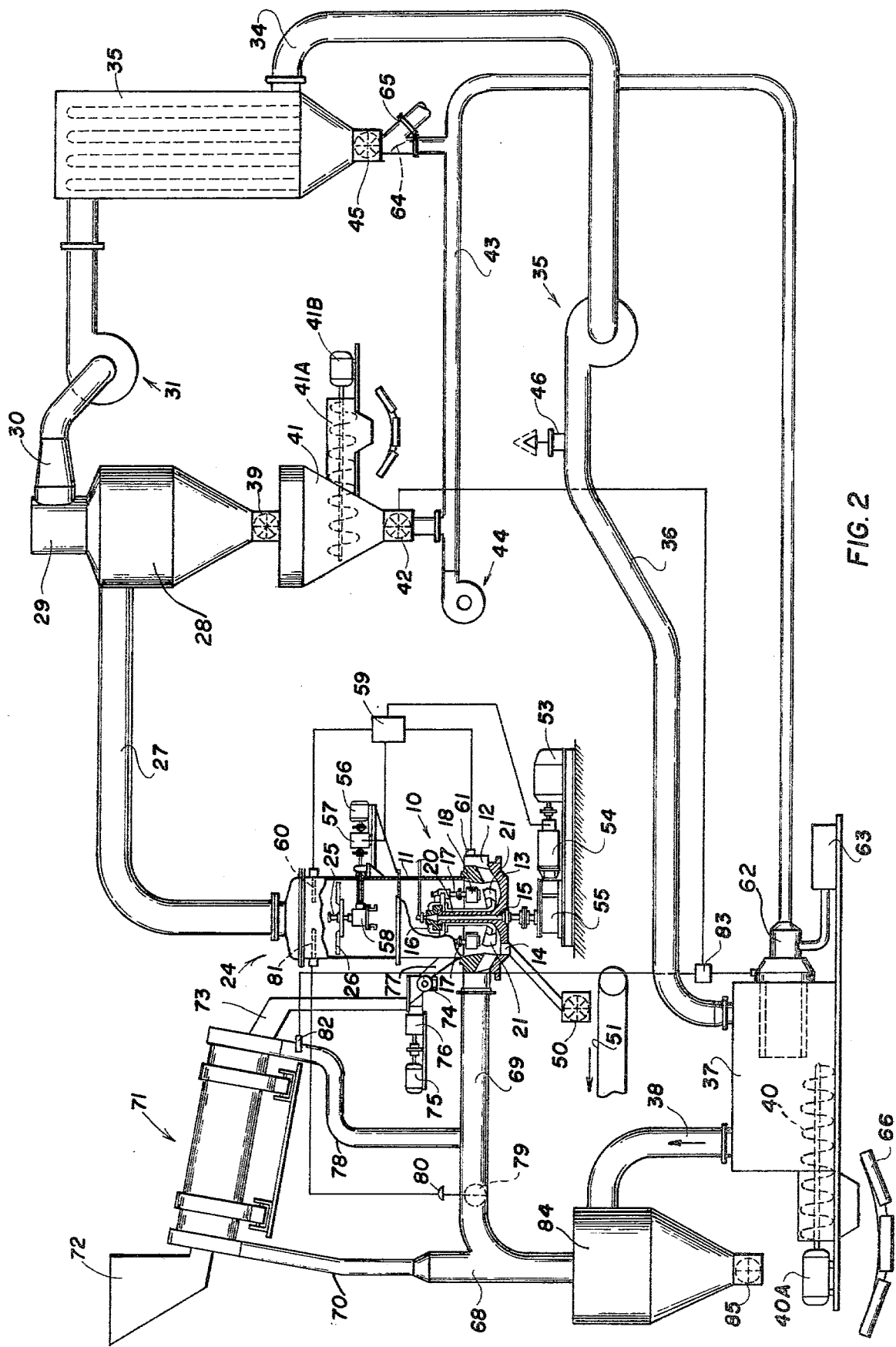
FIG. 2 is a schematic arrangement of components which depict a modification of the arrangement shown in FIG. 1.

In the arrangement of the equipment shown in FIG. 2, certain items will be the same as those described in FIG. 1 and where possible the same reference numerals will be used, thereby simplifying the following description. The roller grinding mill 10 is coupled to a spinner separator 24, and these components are operated through speed controlled motor operated transmissions 54 and 57 respectively. The output from the separator 25 moves through conduit 27 to the cyclone 28 where the ground material is separated from the gases caused to flow by reason of the fan 31 drawing those gases through the cyclone outlet 29 and conduit 30 and delivering it to the bag house 33. In the foregoing system, the cyclone separator 28 is provided with a rotary exhaust valve 39 which is connected into a ground material receiving bin 41. The bin 41, in turn, has a rotary exhaust valve 42 which operates to release the grindings into a feed conduit 43 which is pressurized for moving the grindings by a fan 44. The conduit 43 extends to the furnace 37 to deliver the grindings for consumption as a fuel for the furnace. A portion of the grindings may consist of the dust forming fines released at the bag house rotary exhaust valve 45 into conduit 43. It can be seen that the gases moved by the secondary fan 35 have a portion thereof released to ambient atmosphere at the exhaust stack 46. Any fines extracted at the bag house 33 are passed by rotary valve 45 either into conduit 43 to mix with the ground material from the cyclone 28 or into the conduit 65 when the valve 64 is moved. The gases drawn from the bag house through conduit 37 by the secondary blower 35 is moved through conduit 36 to the furnace 37 to support combustion. Part of the gases moved by the secondary blower 35 is exhausted to atmosphere at stack 46 as steam and at a temperature above the dew point.

The FIG. 2 arrangement differs from the FIG. 1 arrangement in that the hot gases passing the cyclone 84 flow into a diverter conduit section 68 so that part of the gases may flow by conduit 69 into the bustle 12 of the mill 10, and part may flow through conduit 70 into a rotary dryer unit 71 of known character. The raw sewage sludge is dumped into a feed hopper 72 which directs it into the rotary dryer 71 to be dried on its way to the feed chute 73 connected to the feed gate 74 at the mill 10. The feed gate 74 is operated by motor 75 driving a speed controllable transmission 76 to release the sludge into the chute 77 into the mill 10. The gases delivered to the rotary dryer 71 exit at conduit 78 and are delivered to conduit 69 so as to by-pass a control valve 79 in conduit 68. The valve 79 has a motor operator 80 subject to a thermostatic sensor 81 in the head of a spinner separator 24 for the purpose of maintaining a temperature of about 250° F. at that location.

In the operation of the arrangement seen in FIG. 2 the sewage sludge fed to the rotary dryer may contain on an average of up to 80% water. The dryer 71 reduces the water content to about 40% by the time the sludge passes into chute 77 on its way to the grinder mill 10. The sludge is ground in the mill 10 to a size ranging between 50% minus 100 mesh and 70% minus 200 mesh. The fineness of the ground material is controlled by the action of the spinner separator 24, and is conveyed by conduit 27 to the cyclone 28 where it is collected in bin 41, as previously described, and passed by the rotary valve 42 into the blower output conduit 43 for delivery into the furnace burner 62. The gases from the cyclone 28 are moved by blower 31 to be substantially cleaned of fines at the bag house 33 before being moved by the secondary blower 35 and conduits 34 and 36 to the furnace 37. The heat generated by the furnace comes initially from combustion of an outside fuel from the source 63, but as the system reaches operating conditions the burner fuel will be derived from the prepared sewage sludge. Should the BTU content of the sludge be in the range of 5800 BTU per pound it is expected that substantially all of the sludge will be burned at the furnace to produce the requisite heat for drying and conditioning the sludge to be ground by the mill. It is important to operate with the temperature in the spinner separator 24 to be in the range of about 250° F. so that when the gases reach the exhaust stack 46 the temperature will normally be in the range of 180° F., whereas the dew point is about 160° F. Should the temperature in the spinner separator 24 drop below the 250° F. range, the sensor 81 will open the valve 79 and allow more of the hot furnace gases which are in the range of about 800° F. to flow directly to the mill air bustle 12. The blowers 31 and 35 work in conjunction to maintain movement of the ground material and gases in the system.

As the system of either FIGS. 1 or 2 receives sewage sludge with a BTU content at a valve of 7000 BTU per pound there will be an excess of ground material over what is needed as a fuel for the furnace 37. That excess can be diverted at the bottom outlet from the mill 10 and be moved by conveyor 51 to a collecting station (not shown). In the use of the bottom outlet 14, the material issuing therefrom will be granular in size and consist mainly of the coarse and hard-to-grind fractions. This will result in the rest of the ground sludge being refined and freed of the hard-to-grind fractions so that less ash and residual material will be produced as a result of combustion, and less so called "fly ash" will be carried around the system. What fly ash that is produced will generally be extracted at the cyclone 84 or at the bag house, and by properly setting the valve 64 it can be diverted from the system through conduit 65 to a collection station (not shown).

An example of operation of the system shown in FIG. 1 is as follows: It is assumed that the sewage sludge is fed at a rate of 10,000 pounds per hour in a condition where it may contain up to 80% water so there would be only one ton of solids. This sludge is fed to the hopper 47 and is moved by the screw 48 into chute 22 where it drops into the grinding chamber of mill 10. A bottom opening 14 communicates with a rotary discharge valve 50 for permitting a portion, up to about 60%, of the contents of the mill grinding chamber to be extracted. The extracted portion is conveyed by conveyors 51 and 52 back to the hopper 47, while the remainder of the sludge is ground and passed through the spinner separator to the conduit 27 which delivers it into the cyclone separator 28. The spinner separator blades 26 act to control the size of the ground sludge by returning the larger sizes internally to the mill for further grinding. On the other hand, the cyclone separator 28 removes most of the ground sludge from the air in the system and passes it through the rotary valve 39 to bin 41.

The primary fan or blower 31 moves about 13,500 SCFM of air which is at about 200° F. That air is delivered to the bag house 33 where most of the very fine particles are captured, and the air is moved through conduit 34 by a secondary fan or blower 35 into conduit 36 to be delivered to the furnace 37 to support combustion. However, a substantial proportion of the air is exhausted out of the stack 46. In this example, the air exhausted amounts to about 6000 SCFM at about 180° F. which is above the dew point of about 160° F. The remainder of the air which is about 7500 SCFM at 180° F. is moved to the furnace 37 where the oxygen is burned out to less than 14% by weight—resulting in a relatively inert system. The product collected in bin 41 is of a size suitable for use as a fuel to produce heat in the system for drying subsequent incoming sewage sludge which is released by the rotary valve 42 into conduit 43 for movement by fan or blower 44 to the burner 62. The excess is removed by the screw conveyor 41A as noted before. The system is provided with a rotary valve 45 at the bag house 33 to release the collecting fines into conduit 43 if desired.

If the sewage sludge has a value of about 7000 BTU per pound it will allow the extraction of about 16% of the ground material to be taken out of the system as there will be sufficient heat value left in supplying 84% of the material as a fuel to dry the incoming sludge. As the BTU content of the sludge falls off to about 5900 BTU per hour more of the ground material needs to be supplied as fuel for the furnace. In the start up phase of the present system, the outside fuel from source 63 is used to supply the drying air at about 800° F. in stack 38, and the fans move about 13,500 SCFM of heated air as pointed out above. As the system reaches a stable condition, the combustion at the furnace 37 will lower the system oxygen to below 14% which reduces the chances of an explosion since the internal atmosphere is at an oxygen poor level for an explosion to occur. Once the equilibrium of the system has been reached it will be possible to recycle part of the material released at valve 50 onto conveyor 51 back to the hopper 47 by conveyor 52, and collect part for sale as a fertilizer. The proportioning of the amount of material between that released by valve 50 and that moved through the spinner separator 24 is such that approximately one half is released at the valve 50. However, the main requirement that needs to be satisfied is to dilute the incoming sludge with hot granular material so the roller mill will not plug up.

In the system of FIG. 2, the addition of the rotary dryer 71 calls for a different operating procedure. Here the operation is such that the hot granular sludge coming off at the rotary valve 50 is conducted by the conveyor 51 such that as much of the hot granular sludge as is needed to assure operation of the roller mill without plugging up is delivered to the hopper 72, such as is the manner shown in FIG. 1 by a suitable conveyor 52. The rate of feed of the fines from the storage bin 41 to the furnace burner 62 is controlled through a temperature sensor 82 located in the hot air exit conduit 78 from the rotary dryer 71. The sensor 82 signals suitable means in the control center 83 for the burner 62 such that a signal is directed to the drive for the rotary valve 42 to increase or decrease the rate of release of the fines into the conduit 43 for the purpose of maintaining temperature in conduit 78 at a level sufficient to keep the desired temperature in the spinner separator 24 at about 250° F. That control works in cooperation with the temperature sensor 81 to modulate the position of the valve 79 so that upsetting influences in the desired temperature sensed at means 81 can be counter-acted. It is contemplated that sewage sludge delivered to hopper 72 may vary suddenly in its moisture content to reduce the temperature in the conduit 78, and that is a sign that the feed to the roller mill may result in plugging the mill. The response can be delivery of more heat to the mill by opening valve 79, or by increasing the percentage of the hot granular sludge released at rotary valve 50 that is recycled into the hopper 72.

The system depicted in FIG. 1 operates in substantailly the same manner, that is to say the percentage of hot granular sludge delivered to the hopper 47 may be adjusted to maintain the moisture content of the material fed into the roller mill grinding chamber at a level that will avoid plugging the mill.

In either system of FIG. 1 or FIG. 2, the operation is capable of producing a substantially dry granular sludge at conveyor 51 which is suitable for use as a commercial fertilizer, or of skimming off excess fines at the screw 41A which is suitable to be sold as a commercial fuel when used in a burner adapted to handle very fine ground essentially organic material.

Both systems of FIGS. 1 and 2 are provided with secondary cyclone separators 84 in the hot air stack 38 to extract substantially all of the fly ash which is extracted from the system and constantly released at rotary valve 85 to be collected on conveyor 66 and led off for suitable disposal, along with the fines which may be released at discharge conduit 65 when the valve 64 is set properly.

The arrangement of apparatus described in FIGS. 1 or 2 may be rearranged or modified in a manner for eliminating the odor from gases necessarily exhausted from the present system. The modifications have been schematically shown in FIGS. 3 and 4 in association with the arrangement of FIG. 1. For convenience, the reference characters used to designate parts and components in FIG. 1 will be applied to the same parts and components set forth in FIGS. 3 and 4.

Figure 3:
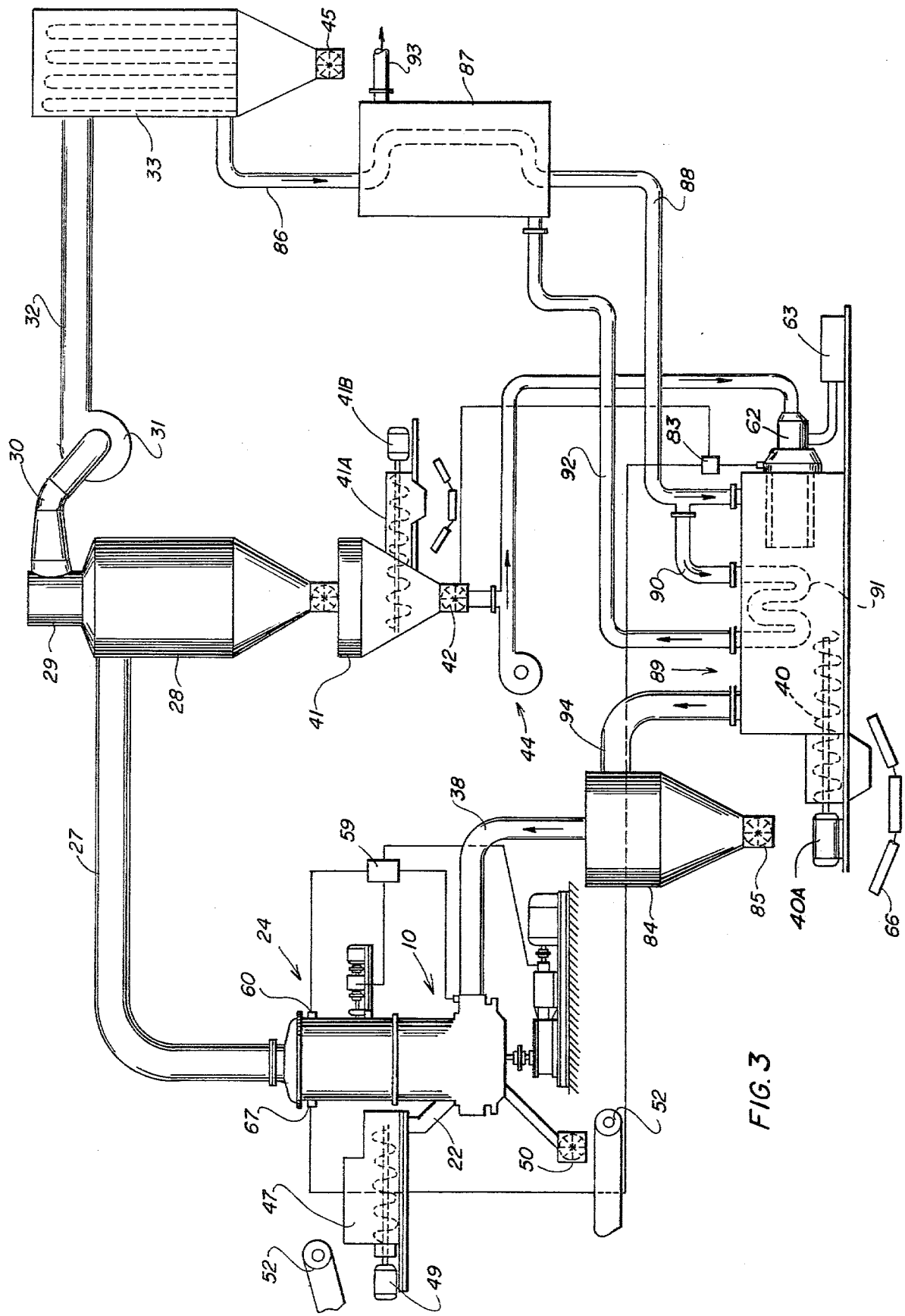
FIG. 3 is a schematic arrangement of components setting forth a further modification of the arrangement shown in FIG. 1.

In FIG. 3 the elimination of odors is accomplished by conducting the gases from the bag house 33 through conduit 86 to a heat exchanger 87 where heat energy recovery can be accomplished. The gases then pass through conduit 88 to the furnace 89, but a portion of the gases is divided out by branch conduit 90 and passes through a second heat exchanger 91 placed in the combustion chamber of the furnace 89. The gases not divided pass directly into and are burned in the combustion chamber of furnace 89. After being in heat exchange relation in means 91 at a temperature of the order of 1200° F., the odor is removed and the hot gases are returned by conduit 92 to the heat exchanger 87 where a substantial value of heat energy is released to the gases in the conduit 86 before the gases are discharged at 93 to atmosphere. In this arrangement particulate matter, such as fly ash and the like, has been removed at the bag house 33 so that discharge at 93 is free of such material.

The arrangement of FIG. 3 will preserve the humidity characteristics of the arrangement seen in FIG. 1, while eliminating substantially all odor. The use of the heat exchanger 91 prevents contamination of the gases that may be in the burner, and at the same time relying on the high temperature at the exchanger to destroy pathogenic agents associated with odors and thereby sanitizing the gases exhausted to atmosphere.

Figure 4:
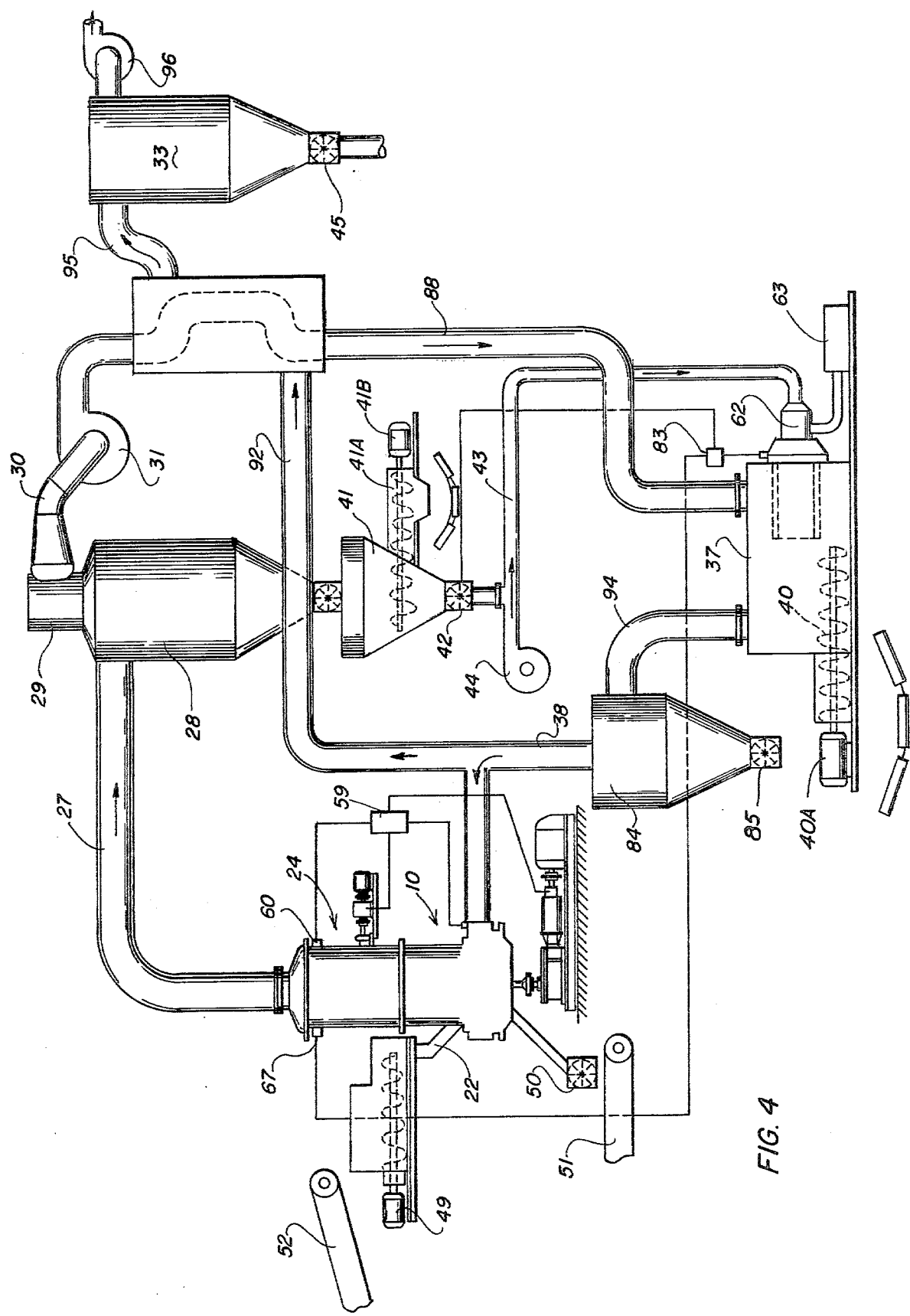
FIG. 4 is another schematic arrangement of components constituting a modification over that shown in FIG. 3.

The modified arrangement seen in FIG. 4, has the heat exchanger 87 connected between the fan 31 and the bag house 33. This is deemed satisfactory since the gases flowing in conduit 88 now are conducted into the combustion chamber of furnace 37. The furnace stack 94 is connected to the separator 84 where fly ash and most particulate matter is removed from the hot gases moving in conduit 38. This is an essential difference, and includes conducting part of the hot stack gases through conduit 92 to the heat energy recovery heat exchanger 87. The gas flow from the Exchanger 87 then passes by way of conduit 95 to the bag house 33 under the influence of the blower 96 which exhausts to ambient atmosphere gases free of odor and particulate matter.

In the arrangement of apparatus of FIGS. 3 and 4, the volume of gas exhausted to atmosphere is dependent upon the allowable dew point inside the system as well as the oxygen content of the gases in the system. Normally the dew point and the oxygen content varies proportionately and inversely to each other, so that as the dew point goes down, the oxygen content goes up. When the system is operating at optimum conditions it is desirable to have the oxygen content at approximately 14%, and this will determine the dew point to be approximately at 160° F., with an exhaust of three quarters of the total gas volume. The systems are intended to operate so that the exhaust gas volume released at outlets 93, in the system of FIG. 3, and released at the exhaust from blower 96 in the system of FIG. 4, will be substantially equal to the gas volume inlet developed at blower 44. The gases thus exhausted will contain and carry out of the system the evaporated water vapor, as well as the water vapor developed as products of combustion in the furnace 37 or 89 respectively.

It should be understood that the systems of FIGS. 3 and 4 differ from the system of FIG. 1 in the way the exhaust gases are released at vent 46.

In FIG. 3 the gases moved in the system pass through the heat exchanger 87 and are led by conduit 88 into the furnace 89, but a portion of the gases is split off at conduit 90 and conducted through a heat exchanger 91 located in the combustion chamber of the furnace 89 before flowing through conduit 92 and back to the heat exchanger 87. The heat exchanger 87 recovers the heat picked up in the furnace 89 so that exhaust to atmosphere at conduit 93 has given up a large percentage of its heat value. This arrangement takes the place of venting the system gases at 46 as shown in FIG. 1.

In FIG. 4, instead of exhausting gases in the vent 46 as taught in FIG. 1, the gases are conducted through conduit 88 directly to the furnace 37, and after the odors are pathogenically destroyed the gases are then conducted by the stack 94 into the cyclone separator 84 where particulate matter is extracted. The gases leave the separator 84 through conduit 38, and a portion thereof is conducted by conduit 92 back to the heat exchanger 87 where the heat picked up in the furnace 37 is released to the gases flowing through the conduit 32 into the exchanger 87. Before the gases are exhausted to atmosphere they are run through the bag house 33 at conduit 95 where the final particulate clean up takes place.

What is claimed is:

1. Sewage sludge disposal apparatus comprising: a roller mill for receiving and grinding the sewage sludge, said roller mill having a gaseous medium inlet and an outlet for ground sludge moved by the gaseous medium; a furnace for burning fine ground sewage sludge and producing heat for drying sewage sludge; classifier means having an inlet connected to said roller mill outlet and a common outlet for ground and classified sewage sludge and the gaseous medium; separator means having an inlet connected to said classifier means common outlet and spaced outlets, one of said outlets being for ground sewage sludge and another of said outlets being for gaseous medium substantially free of ground sludge; gaseous medium conduit means connected between said another of said outlets of said separator and said furnace; ground sewage sludge conduit means connected between said one separator outlet and said furnace for delivery of the ground sewage sludge to be used as a fuel in said furnace; connecting means between said furnace and said roller mill gaseous medium inlet for delivering hot furnace gaseous medium to said roller mill; means at said separator means operative to extract a portion of the ground sewage sludge from said apparatus in advance of said furnace; and other means connected to said roller mill for collecting a portion of the sewage sludge directly from said roller mill for return to said roller mill with sewage sludge received for grinding therein.

2. The sewage sludge disposal apparatus set forth in claim 1, wherein: a primary gaseous medium moving blower is located in said gaseous medium conduit, and cleaning means is connected into said blower for removing dust and extreme fines from the gaseous medium prior to delivery to said furnace.

3. The sewage sludge disposal apparatus set forth in claim 1 wherein: said other means connected to said roller mill for collecting a portion of the sewage sludge directly from said roller mill includes power operated means, whereby the portion of the sewage sludge extracted from said roller mill is substantially granular and substantially free of fine ground sewage sludge.

4. The sewage sludge disposal apparatus set forth in claim 3, wherein said power operated extracting means is substantially continuously operated to effect removal from said roller mill of hard to grind material, whereby said fine ground sewage sludge is rendered low in ash content.

5. The sewage sludge disposal apparatus set forth in claim 1, wherein: variable drive means is connected to said roller mill, variable drive means is connected to said classifier means, and control means is connected to both of said variable drive means for modulating the rate of roller mill grinding, said control means being responsive to the pressure drop across said roller mill and classifier means.

6. The sewage sludge disposal apparatus set forth in claim 1, wherein said gaseous medium conduit means connected between said another separator outlet and said furnace includes heat exchanger means for receiving the gaseous medium prior to its delivery to said furnace, and conduit means connected between said furnace and said heat exchanger means for delivering furnace heat into the gaseous medium in said heat exchanger means, said heat exchanger means having a discharge to atmosphere.

7. The sewage sludge disposal apparatus set forth in claim 1, wherein said gaseous medium conduit means connected between said another separator outlet and said furnace includes a primary blower having an outlet, means for removing dust and extreme fines from the gaseous medium delivered from said primary blower outlet, and heat exchanger means, and means connected between said furnace and said heat exchanger means for introducing furnace heat thereto.

8. The sewage sludge disposal apparatus set forth in claim 1, wherein said gaseous medium conduit means connected between said another outlet and said furnace includes heat exchanger means, and said connecting means between said furnace and said roller mill gaseous medium inlet includes means for directing a portion of the hot gaseous medium to said heat exchanger means, said heat exchanger means having a discharge, and means in said discharge for removing dust and extreme fines from the gaseous medium, said last means having a discharge to atmosphere.

9. Wet sewage sludge disposal apparatus comprising a roller mill, means to feed raw sewage sludge into said roller mill, means to grade the size of ground sewage sludge particles turned out by said roller mill, a separator connected to said ground sewage sludge grade means, removal means connected to said separator to remove the separated ground sewage sludge, a furnace having a connection with said removal means to receive the ground sewage sludge as a fuel, means connected between said separator and said furnace to direct the air in the system into said furnace to support combustion of the ground sewage sludge, conduit means connecting said furnace with said roller mill to supply the heat of combustion for drying the sewage sludge during grinding, conveying means for receiving dried sewage sludge from said roller mill and recycling it to said means to feed raw sewage sludge into said roller mill, and means at said feed means to combine the recycled sewage sludge with raw sewage sludge to reduce the wetness of the combination.

10. The wet sewage sludge disposal apparatus set forth in claim 9, wherein said roller mill is provided with a grinding chamber having an outlet for bleeding off a partly ground portion of the sewage sludge fed into said grinding chamber, and means adjacent said outlet for releasing the sewage sludge to said conveying means which recycles the sewage sludge to said feed means.

11. The wet sewage sludge disposal apparatus set forth in claim 9, wherein said roller mill is provided with a casing enclosing a grinding chamber having a first outlet connected to said means to grade the size of ground sewage sludge and a second outlet for bleeding off a portion of the sewage sludge being ground in said mill, said conveying means receiving sewage sludge from said second outlet.

12. A method of disposing of wet sewage sludge comprising the steps of: connecting up in a first circulating system and in series order a sewage sludge roller grinding mill, a classifier to size the ground sewage sludge particles, a cyclone separator to extract substantially all of the ground sewage sludge, means for moving the ground sludge by gaseous medium into the cyclone separator, a furnace to receive the gaseous medium substantially free of sludge particles, and a connection to conduct the gaseous medium from the furnace at combustion heat to the roller grinding mill to effect drying of the wet sewage sludge; and connecting up in a second circulating system means for moving the sewage sludge from said cyclone separator to said furnace to move the ground sewage sludge into said furnace for combustion disposal therein; and feeding raw wet sewage sludge into the roller grinding mill.

13. The method of disposing of wet sewage sludge set forth in claim 12, and including the step of extracting ground sewage sludge in excess of the needs of said furnace at the collecting means.

14. The method of disposing of wet sewage sludge set forth in claim 12, and including the step of extracting from the roller grinding mill partly ground sewage sludge material.

15. The method of disposing of wet sewage sludge set forth in claim 12, and including the step of extracting from the roller grinding mill partly ground sewage sludge material, and the step of recycling the extracted partly ground sewage sludge into the feeding of raw wet sewage sludge into the roller grinding mill for reducing the initial wetness.

16. The method of disposing of wet sewage sludge set forth in claim 12, and including the step of predrying the raw wet sewage sludge in advance of feeding it into the roller grinding mill.

17. In sewage sludge processing apparatus the combination of: a roller mill having a grinding chamber formed with a material feed inlet, a bottom outlet for granular material, a discharge for fines, and means to direct a flow of gaseous medium into the grinding chamber for moving the fines through the discharge; a furnace having a fuel burner and a hot gaseous medium outlet; means connecting the furnace hot gaseous medium outlet to said flow means for said roller mill grinding chamber; flow conducting means connected between said roller mill grinding chamber discharge and said furnace fuel burner for extracting the fines moved through said roller mill discharge and conducting the fines to said furnace fuel burner for use as the fuel to produce hot gaseous medium for drying material in said roller mill grinding chamber; feed means for sewage sludge connected to said roller mill feed inlet; and moving means extending between said roller mill grinding chamber bottom outlet and said feed means for supplying hot granular sewage sludge to mingle with the feed of sewage sludge to reduce the overall moisture content in the material fed to said roller mill grinding chamber to a level such that said roller mill will not plug up and become inoperative.

18. The combination set forth in claim 17, wherein: said moving means extending between said roller mill grinding chamber bottom outlet and said feed means includes rotary outlet means operable at a rate to supply hot granular sewage sludge to mingle with the sewage sludge for reducing the moisture content in the material fed to substantially forty percent by weight of the material fed thereto.

19. The combination set forth in claim 17, wherein: said flow conducting means includes cyclonic separator means for separating fines from the gaseous medium, means to collect the separated out fines and establish a storage bin from which the fines are conducted to said furnace, and blower means to move fines from said storage bin to said furnace fuel burner.

20. The combination set forth in claim 17, wherein: said flow conducting means includes classifier means connected to said roller mill grinding chamber discharge to return to said grinding chamber material larger than fines for further reduction, cyclonic separator means connected to said classifier means for separating the fines from the gaseous medium, blower means connected between said cyclonic separator and said furnace to direct the air thereto to support combustion of the fines, storage bin means connected to said cyclonic separator for collecting and storing the fines, and gaseous medium moving means for fines connected from said storage bin to said furnace fuel burner to deliver fines for combustion in said furnace for the production of hot drying gaseous medium.

21. The combination set forth in claim 17, wherein: said flow conducting means includes means for extracting fines therefrom in excess of the fuel requirements of said furnace fuel burner.

22. The combination set forth in claim 17, wherein: said furnace hot gaseous medium outlet connecting means includes means for extracting ash particles in the gaseous medium heated by combustion of the fines as the fuel for said furnace fuel burner.

23. The combination set forth in claim 17, wherein: there is means for directing a portion of the heated gaseous medium from said furnace into moisture drying relation with said feed means for sewage sludge.

24. Sewage sludge disposal apparatus comprising: first means for sequentially grinding and classifying the sewage sludge; a gaseous medium transport system connected across said first means for moving the classified ground sewage sludge away from said first means and returning only gaseous medium to said first means, said transport system including separator means for extracting the classified ground sewage, heat exchange means for receiving the gaseous medium from said separator means, and furnace means connected to said heat exchanger means and having a hot gaseous exhaust connected to said grinding and classifying means for supplying drying heat to said transport system at said grinding and classifying means; and means connected between said furnace means and said heat exchange means for imparting heat into said gaseous medium in advance of its reaching said furnace means.

25. The apparatus set forth in claim 24, wherein: said last recited means includes a second heat exchange means in said furnace means having an inlet connected to said connection between said furnace and said heat exchanger means for receiving a portion of the gaseous medium.

26. In apparatus for grinding material for use as a fuel for firing burners, the combination of: a roller mill having a grinding chamber with an inlet for the material to be ground and a discharge for the ground material; grinding rolls rotatable within said grinding chamber for grinding the material by centrifugal force of said rolls against said grinding chamber; a source of gaseous medium connected into said grinding chamber for moving the ground material through said grinding chamber discharge; a second chamber connected to said grinding chamber adjacent said discharge for receiving the ground material; rotary classifier means in said second chamber operable for classifying the ground material for particle size and returning oversize material to said grinding chamber; separate prime mover means connected to said grinding rolls and to said rotary classifier means; and control means connected to each of said prime mover means, said control means being effective to vary the speed of each of said separate prime mover means, whereby ground particle size discharged from said second chamber is controlled through adjusting the centrifugal force exerted by said rolls inversely with speed of said rotary classifier means.

* * * * *